US006899098B2

(12) United States Patent
Durbin

(10) Patent No.: US 6,899,098 B2
(45) Date of Patent: May 31, 2005

(54) PORTABLE SOLAR HEATER AND METHOD FOR USING THE SAME

(76) Inventor: Ricky L. Durbin, 164 W. Bond St., Bement, IL (US) 61813

( * ) Notice: Subject to any disclaimer, the term of this patent is extended or adjusted under 35 U.S.C. 154(b) by 0 days.

(21) Appl. No.: 10/663,114

(22) Filed: Sep. 16, 2003

(65) Prior Publication Data

US 2005/0056272 A1 Mar. 17, 2005

(51) Int. Cl.[7] .................................................. F24J 2/42
(52) U.S. Cl. .................. 126/629; 160/320.21
(58) Field of Search .............................. 126/629, 633; 160/370.21, DIG. 3; D6/575, 576

(56) References Cited

U.S. PATENT DOCUMENTS

| | | | | |
|---|---|---|---|---|
| 3,960,135 A | * | 6/1976 | Angilletta | 126/633 |
| 4,020,826 A | * | 5/1977 | Mole | 126/633 |
| 4,054,125 A | * | 10/1977 | Eckels | 126/633 |
| 4,409,960 A | * | 10/1983 | Balzer | 126/633 |
| 4,419,982 A | * | 12/1983 | Eckels | 126/633 |
| 4,751,115 A | * | 6/1988 | Smith et al. | 160/370.23 |
| 4,971,028 A | * | 11/1990 | Fagan | 126/633 |
| 5,081,982 A | * | 1/1992 | MacKenzie | 126/629 |

* cited by examiner

*Primary Examiner*—Sara Clarke
(74) *Attorney, Agent, or Firm*—Wood, Phillips, Katz, Clark & Mortimer

(57) ABSTRACT

A portable solar heater (10) is provided for use with a window (12) of an enclosed space (14) of a building structure or vehicle (16). The portable solar heater (10) includes a sheet metal body (30) and a releasable support (32) to mount the sheet metal body (30) relative to an interior surface (20) of the window (12). The sheet metal body (30) includes a pair of oppositely facing surfaces (34,36) separated by a thickness t of the sheet metal. One of the surfaces (34,36) is a window facing surface (34) and is a highly solar energy absorptive surface.

20 Claims, 4 Drawing Sheets

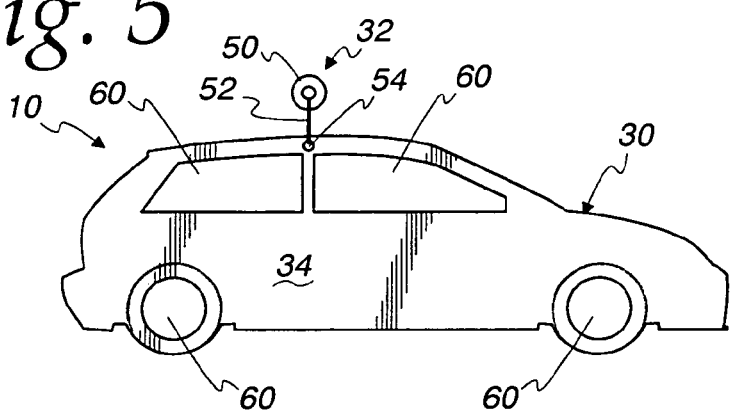
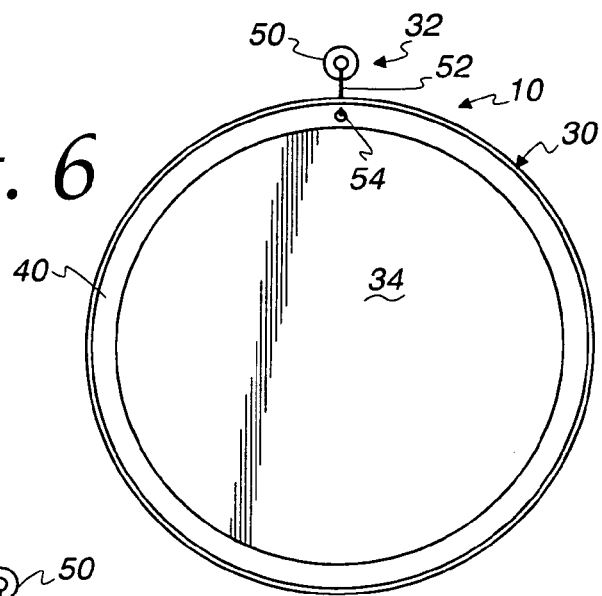
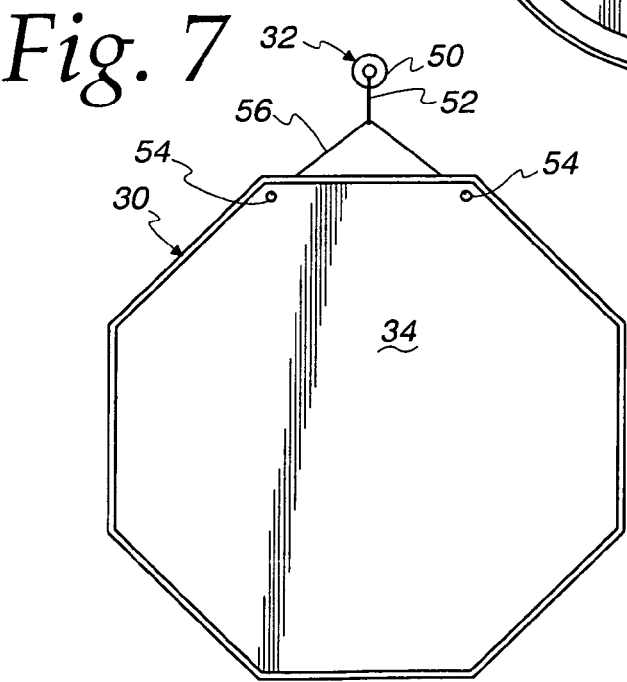

PORTABLE SOLAR HEATER AND METHOD FOR USING THE SAME

FIELD OF THE INVENTION

This invention relates to solar heaters, and more particularly, to portable solar heaters for use in heating the room(s) or compartment(s) of a building or vehicle.

BACKGROUND OF THE INVENTION

Many forms of solar heaters are known, particularly for heating the rooms of a building structure, such as a home, garage, school, restaurant, office, factory, etc. One common type of such solar heaters is active solar heaters wherein one or more solar panels or collectors are provided in an appropriate location on or adjacent the building to collect and concentrate solar energy for heating of a transport medium, typically fluid, which then transports the heat to the interior of the building. Another conventional type of solar heater involves a passive solar heater wherein a structure, such as sun room, is provided on an appropriate, i.e., sun facing, side of the building to collect solar energy which is then transported to other rooms of the building via natural convection and conduction. Some common characteristics of both of these types of conventional solar heaters is that they are relatively expensive and not particularly portable. Another characteristic is that they are not particularly well suited for the heating of the interior compartments of a vehicle, such as an automobile, truck, or motor home. Accordingly, there is room for improvement in the field of solar heating.

SUMMARY OF THE INVENTION

It is the principal object of the invention to provide an improved solar heater.

It is another object of the invention to provide an improved solar heater that is portable.

It is yet another object of the invention to provide an improved solar heater that is relatively inexpensive.

According to one aspect of the invention, a method is provided for heating a compartment or room having a window. The method includes the steps of releasably connecting a portable metal solar heater to an interior surface of the window, heating the compartment or room via the solar heater, selectively removing the solar heater from the window during periods when the heating step is not desired, and repeating the connecting, heating and removing steps to help maintain the compartment or room within a desired temperature range. The solar heater has a highly solar energy absorptive window facing surface.

According to another aspect of the invention, a method is provided for heating a house or vehicle including at least two windows having a fixed spatial relationship to each other. The method includes the steps of releasably connecting a portable metal solar heater to an interior surface of a first one of the windows, heating a room or compartment associated with the first one of the windows via the solar heater, removing the solar heater from the first one of the windows and releasably connecting the solar heater to an interior surface of a second one of the windows to follow the movement of the sun relative to the windows, and heating a room or compartment associated with the second one of the windows via the solar heater. The solar heater has a highly solar energy absorptive window facing surface. According to a further aspect of the invention, the second heating step involves a different room or compartment from the room or compartment of the first heating step. According to another aspect of the invention, the method further includes the steps of affixing a first releasable connector to the first one of the windows and affixing a second releasable connector to the second one of the windows, and the removing step includes disconnecting the solar heater from the first releasable connector and connecting the solar heater to the second releasable connector.

In accordance with another aspect of the invention, a portable solar heater is provided for use with a window of a room or compartment. The portable solar heater includes a sheet metal body having oppositely facing surfaces separated by a thickness of the sheet metal, and a releasable support to mount the sheet metal body relative to an interior surface of the window. One of the oppositely facing surfaces of the sheet metal body is a highly solar energy absorptive window facing surface.

According to one aspect of the invention, the window facing surface has a radiant absorptivity of no less than 0.90, and in a highly preferred form no less than 0.94.

In on aspect, the window facing surface has a black coating, and in a highly preferred form, the black coating is a flat black paint.

According to one aspect, the window facing surface is planar.

According to another aspect, the window facing surface is concave. In a further aspect, the window facing surface has a radius of curvature that is greater at a center of the window facing surface than at opposite edges of the window facing surface.

According to one aspect, the window facing surface is embossed to form a decorative design on the other of the oppositely facing surfaces of the sheet metal body.

In one aspect, the sheet metal body includes a peripheral flange extending around the window facing surface and extending from the window facing surface towards the window with the sheet metal body mounted relative to the interior surface. In a further preferred aspect of the invention, at least a lower part of the flange abuts the interior surface with the sheet metal body mounted relative to the interior surface.

In accordance with one aspect, each of the oppositely facing surfaces has a surface area no greater than two square feet.

In one aspect, the sheet metal body weighs no more than two pounds.

In accordance with one aspect, the sheet metal body has an outer periphery shaped to resemble an outline of an object.

According to one aspect, the other of the oppositely facing surfaces is a room facing surface and has a corrosion protective finish thereon.

According to one aspect, the other of the oppositely facing surfaces is a room facing surface and has a decorative feature thereon. In a further aspect, the decorative feature is painted on and/or embossed in the room facing surface.

Other objectives, aspects, and advantages of the invention will be realized from a detailed review of the entire specification, including the appended drawings and claims.

BRIEF DESCRIPTION OF THE DRAWINGS

Each of FIGS. 5–8 show an alternate form of a portable solar heater embodying the present invention.

DETAILED DESCRIPTION OF THE PREFERRED EMBODIMENT

Figure 1:
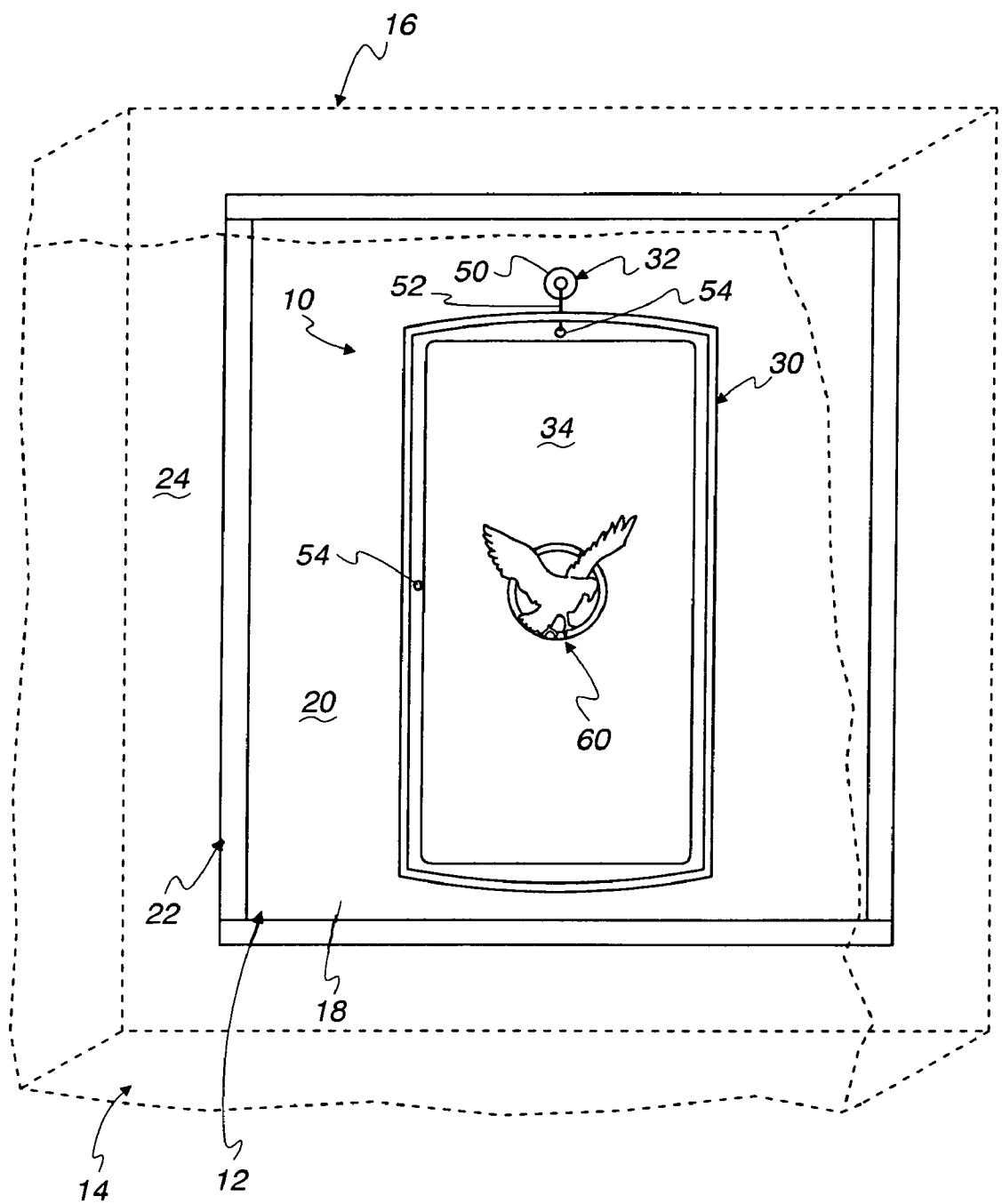
FIG. 1 is a somewhat diagrammatic perspective view showing a portable solar heater embodying the present invention installed against a window of an enclosed space of a building structure or vehicle.

As seen in FIG. 1, a portable solar heater, generally designated 10, is provided for use with a window 12 of an enclosed space 14 of a building or vehicle, shown schematically by the dashed lines at 16. The portable solar heater 10 is intended for use with building structures 16 such as homes, garages, schools, restaurants, apartment buildings, office buildings, etc., and for vehicles such as automobiles, trucks, and motor homes. Examples of suitable enclosed spaces 14 for which the solar heater 10 may be used include a room or rooms of a building structure and/or the occupant compartments of a vehicle. Preferably, the window 12 will on a side of the building structure or vehicle 16 that is facing the sun. The window 12 includes a window glass or pane 18 having an interior side 20 facing the enclosed space 14, and may further include a window frame 22 for mounting the window pane or glass 20 to a wall or door structure 24 of the building structure or vehicle 16. Because the details of the window 12, enclosed space 14 and building structure or vehicle 16 are not critical to the description of the solar heater 10, they will not be described in further detail herein.

Figure 2:
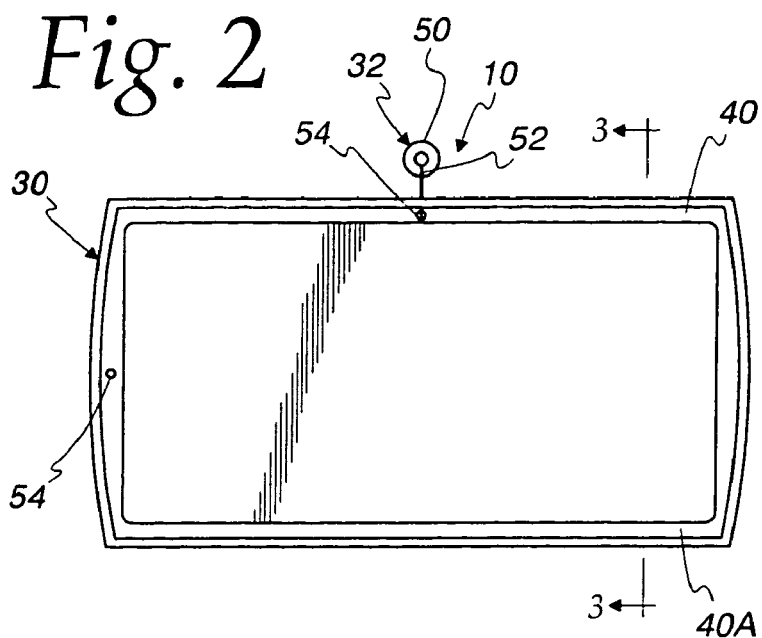
FIG. 2 shows the portable solar heater of FIG. 1 installed with a different orientation from what is shown in FIG. 1.
Figure 3:
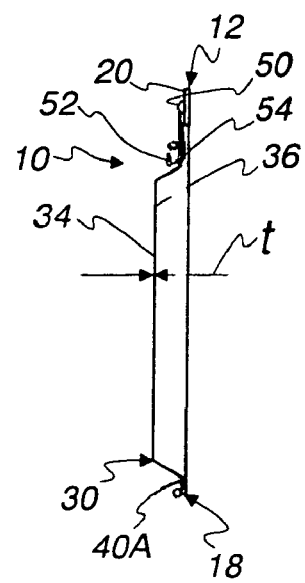
FIG. 3 is a section view taken generally from line 3—3 in FIG. 2.

With reference to FIGS. 1–3, the solar heater 10 will be described in more detail, while noting that FIG. 1 shows the solar heater 10 mounted so that its length extends in a generally vertical direction and FIGS. 2 and 3 show the solar heater 10 mounted so that its length extends in a generally horizontal direction. The solar heater 10 includes a sheet metal body 30 and a releasable support 32 to mount the sheet metal body 30 relative to the interior surface 18 of the window 12. The sheet metal body 30 includes a pair of oppositely facing surfaces 34 and 36 separated by a thickness t of the sheet metal. The surface 34 faces toward the interior of the enclosed space 14, and the surface 36 faces the interior surface 20 of the window 12. The window facing surface 36 is a highly solar energy absorptive surface. In this regard, in some preferred embodiments of the invention, the window facing surface 36 has a black coating, and in highly preferred embodiments the flat black coating is flat black paint. It has been found through testing by the inventor that flat black spray paints that incorporate a hydrocarbon provide a preferred form of the surface 36, without generating a potentially objectionable odor when the solar heater 10 is heated by the sun. Additionally, while not as effective, satin or gloss black coatings, such as satin or gloss paint may also be used. Furthermore, any suitable surface treatment of any texture or color can be used in connection with the window facing surface 36 to achieve a radiant absorptivity for the surface that is no less than 0.90 and, in highly preferred embodiments, no less than 0.94. In this regard, radiant absorptivity can be regarded as the fraction of the incident solar radiation absorbed by the surface 36.

Figure 4A:
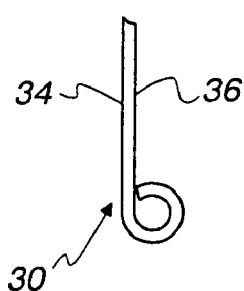
FIGS. 4A–4C are somewhat diagrammatic section views showing alternate embodiments of edge treatments for portable solar heaters embodying the present invention.
Figure 4B:
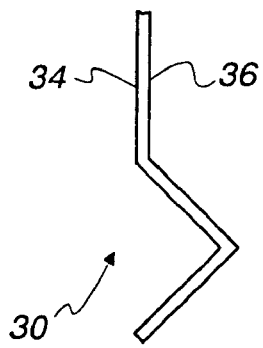
Figure 4C:
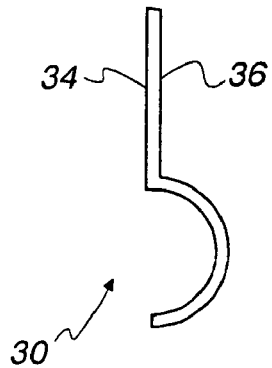

As best seen in FIGS. 2 and 3, the portable solar heater 10 may also include a peripheral flange 40 extending around both the surfaces 34 and 36 and extending from the window facing surface 36 toward the window 12 with the sheet metal body 30 mounted relative to the interior surface 20 of the window 12. In the embodiment of the portable solar heater 10 shown in FIGS. 2 and 3, the flange can be described as panned with rolled edges, i.e., with the edges of the sheet metal rolled to provide structural support for the periphery of the flange 40. The flange 40 serves to stiffen the sheet metal used to form the surfaces 34,36, particularly when a relatively thin gauge of sheet metal is used for the portable solar heater 10. In this regard, it is possible to use other features to stiffen the sheet metal of the surfaces 34,36. For example, a wired or rolled edge such as shown in FIG. 4A can be used, as can folded or curved edges such as shown in FIGS. 4B and 4C. Additionally, a material other than sheet metal can be used to frame the periphery of the surfaces 34 and 36.

A further advantage of the panned portion of the flange 40 is that it can provide a superior angle of incidence when the sun is at a far easterly or westerly extreme with respect to the window 12. Preferably, the surface of the flange 40 facing the inside surface 20 of the window 12 is also a highly solar energy absorptive surface similar to the surface 36, and, more preferably, has the same surface treatment or coating as the surface 36.

The flange 40 serves an additional purpose with respect to the performance of the solar heater 10 in that the solar heater 10 can be mounted so that at least a lower part 40A of the flange 40 abuts the interior surface 20 of the window 12 so as to limit or restrict convection air flow between the inside surface 20 and the window facing surface 36, as best seen in FIG. 3. It is believed by the inventor that such restriction of the convection air flow can improve the performance of the solar heater 10. Additionally, it has been found in some embodiments of the solar heater 10 that the entire flange can be made to engage or abut the interior surface 20 of the window 12 to further limit or restrict convection air flow between the interior surface 20 and the window facing surface 36 and thereby potentially further increase the performance of the portable solar heater 10.

Figure 8:
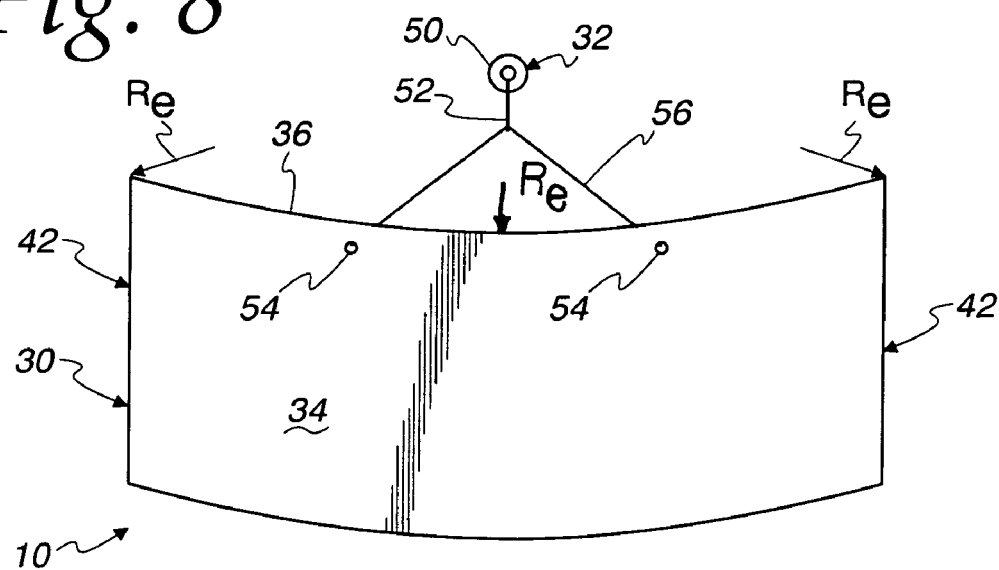

Additionally, while a flange 40 can offer some advantages as described above, the flange 40 or other stiffening enhancement is not always required and can be eliminated, such as shown for the embodiments of the portable solar heater 10 shown in FIGS. 5 and 8, particularly when a thicker gauge of sheet metal is utilized for the body 30.

While the example of the portable solar heater 10 shown in FIGS. 2 and 3 is generally rectangular in shape, as are the associated surfaces 34 and 36, other shapes are possible. For example, other geometric shapes are possible, such as, without limitation, a circular shape as shown in FIG. 6 and an octagon shape as shown in FIG. 7. By way of further examples, as seen in FIG. 5, the outer periphery of the sheet metal body 30 is shaped to resemble the outline of an object, which in FIG. 5 is a car. It should be appreciated that any desired outline could be provided, such as for example, without limitation, a building skyline, cartoon character, logo, etc.

As best seen in FIG. 3, in some embodiments of the portable solar heater 10, the window facing surface 36 is planar or flat. However, in other embodiments of the portable solar heater 10, it may be advantageous for the window facing surface 36 to be concave or slightly bowed away from the inside surface 20 of the window 12, as shown in the embodiment of the portable solar heater 10 of FIG. 8. In this regard, it may also be advantageous in some embodiments for the window facing surface 36 to have a radius of curvature $R_C$ at a center of the surface 36 that is greater than a radius of curvature $R_E$ at opposite edges 42 of the window facing surface 36. It is believed that such a structure can provide superior angles of incidence when the sun is at easterly or westerly extremes relative to the window.

The releasable support 32 is preferably provided in the form of a suction cup 50 that mounts against the inside surface 20 of the window 12, and a hook 52 connected to the suction cup 50 and extending therefrom to engage a hook receiving hole 54 formed in the sheet metal body 30. In this regard, the hook receiving hole 54 can be formed in the flange 40 such as shown in FIGS. 1, 2, 3 and 6, or in the surfaces 34,36, such as is shown in FIG. 5. It should be appreciated that the engagement of the hook 52 in the hook receiving hole 54 provides one releasable connection, and the engagement of the suction cup 50 with the inside surface 20 of the window 12 provides another releasable connection. Furthermore, more than one hook receiving hole 54 can be provided so that the sheet metal body 30 can be mounted in more than one orientation, such as the two different orientations shown in FIGS. 1 and 2 provided by the multiple hook receiving holes 54 shown in FIGS. 1 and 2.

As an alternative construction, the releasable support 32 may also include a chain, string, wire or other elongate flexible member 56 that extends in two directions from the hook 52 to engage a spaced pair of the holes 54 that receive the ends of the elongate flexible member 56 and can be engaged therewith by the use of hooks provided on the ends of the flexible elongate member 56 or by any other suitable means, such as by knotting the ends of the flexible elongate member 56.

It should be appreciated that there are many alternate possibilities for the releasable support 32. For example, with reference to FIGS. 7 and 8, the hook 52 could be eliminated and the elongate flexible member 56 could be directly attached to the suction cup 32. Alternatively, again with reference to FIGS. 7 and 8, the flexible elongate member 56 could be eliminated and another suction cup and hook set 50,52 could be provided, with one of the suction cup and hook sets 50,52, having its hook 52 engaged in one of the holes 54 and the other of the suction cup and hook sets 50,52 having its hook 52 engaged in the other hole 54. As yet another example, the suction cup 50 could be eliminated and the hook 52 could be provided with an end configuration that is suitable for engaging an upper part of the window pane 18 or window frame 22.

Another possible feature of the portable solar heater 10 is the provision of a decorative feature on the room facing surface 34, such as seen in FIGS. 1 and 5. In this regard, the decorative feature could as simple as providing the surface 34 with a surface treatment that provides a decorative color, such as by painting the surface 34, or by providing a decorative design or figure on the surface 34, such as the decorative designs 60 shown in FIGS. 1 and 5. In this regard, there are a number of suitable ways to provide such decorative designs 60. For example, the surfaces 34 and 36 could be embossed to provide the decorative design 60, preferably extending outwardly away from the interior surface 20 of the window 12. The decorative design 60 of FIG. 5, namely the wheel and window elements of the car, are intended to represent this type of three dimensional embossments. Other possible alternatives are to paint or silkscreen a decorative figure or design 60 onto the surface, with or without the previously mentioned embossing. One preferred method is to provide the decorative design 60 using a stenciling template such that the surface 34 underlying the decorative design 60 is covered with paint and the remainder of the surface 34 that does not underlie the decorative design 60 is free of paint, or vice versa, depending upon which option provides a larger area of the surface 34 that is not covered in paint. This is desirable because it is believed that the portions of the surface 34 that are covered with paint may not be as effective for heating as the portions of the surface 34 that are free from paint. The decorative design or figure 60 can be in the form of artwork, logos, advertisements, geometric shapes, etc. Another preferred method is to provide the decorative design 60 so as to resemble a leaded or stained glass window, using a suitable paint or other surface treatment or coating to resemble the came or caming of conventional leaded glass windows, such as brass caming, poly zinc caming, silver nickel/zinc caming, or black patina caming. A suitable protective coating, such as tin plate, galvanize, etc., can be applied to the room facing surface 34 and can serve to simulate translucent, frosted, or etched crystal glass of the simulated leaded glass window design 60. Alternatively, colored paint could be applied to the surface 34 to simulate the colored panes of a stained glass window.

As one example of a convenient method of manufacture, the portable solar heater 10 of FIGS. 1–3 can be made using a common cookie pan or sheet and by applying a suitable surface treatment to the window facing surface 36, such as the previously described flat black paint. The hook receiving holes 54 can be formed by punching or drilling. Similarly, as another example, the embodiment of the portable solar heater 10 shown in FIG. 6 can be made using a conventional round pizza pan and spray painting the window facing surface 36 with a flat black paint. While these examples have been given wherein the portable solar heater 10 can be made using preformed consumer goods, such as cookie or pizza pans or sheets for the body 30, it should be appreciated that the body 30 can be made using any suitable metal forming technique from any suitable piece of sheet metal.

One advantage of the two designs illustrated in FIGS. 1–3 and in FIG. 6 is that they provide a sturdy construction that is both lightweight and relatively low in cost and have the additional advantage of being able to be nested one on top of the other for shipping or storage while not in use.

Figure 9:
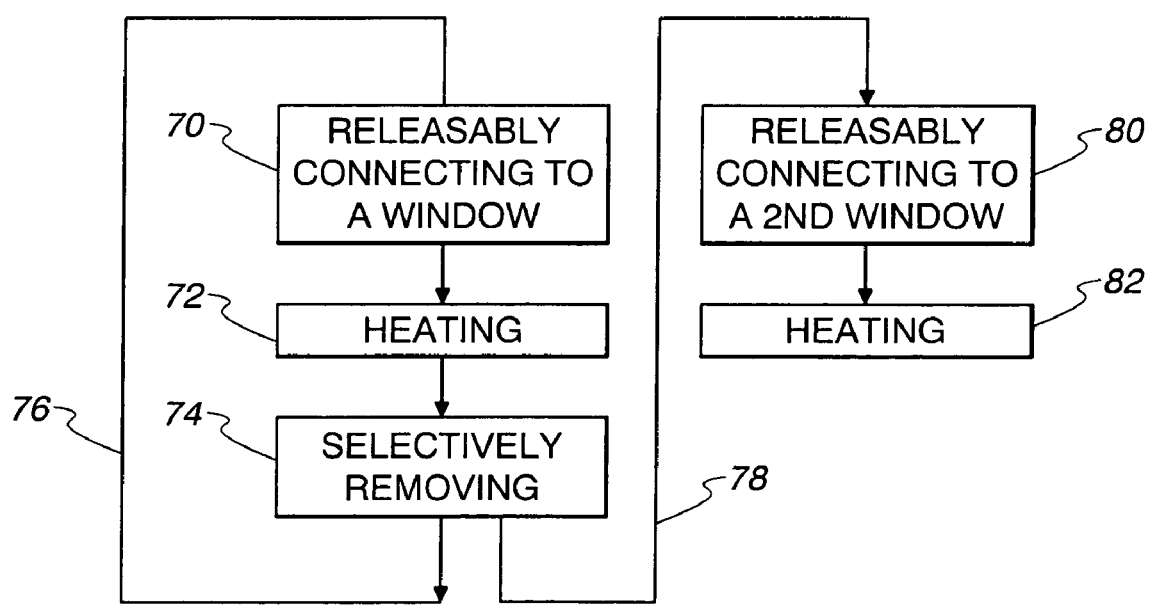
FIG. 9 is a flow diagram illustrating methods embodying the present invention.

In operation, the portable solar heater 10 can be used to heat in an enclosed space 14, such as a compartment or room 14 of the building structure or vehicle 16 by releasably connecting the portable solar heater 10 to the interior surface 20 of the window 12, as shown at 70 in FIG. 9; heating the enclosed space 12 via the solar heater which reaches an elevated temperature due to the solar energy that radiates the surface 36, as shown at 72 in FIG. 9; selectively removing the solar heater 10 from the window 12 during periods when heating is not desired, as shown at 74 in FIG. 9; and repeating the steps of releasably connecting, heating and selectively removing to maintain the enclosed space 14 within the desired temperature range as shown at 76 in FIG. 9. Examples of periods when heating is not desired may be during the summer months of a year, or during the afternoon hours of the day in the spring or fall when additional heating may not be required to maintain the enclosed space 14 in the desired temperature range. The solar heater 10 may also advantageously be used to heat a house or vehicle having two or more windows that are spaced from each such that the amount of solar energy that comes through each of the windows changes during the day as the sun moves through the sky relative to the windows, with one of the windows receiving no solar energy during part of the day and the other of the windows receiving more solar energy during a different part of the day. In this case, the portable solar heater 10 can be releasably connected to the interior surface 20 of a first one of the windows 12, as shown at 70 in FIG. 9; an enclosed space 14 associated with the first one of the windows 12 can then be heated via the solar heater, as shown at 72 in FIG. 9; the solar heater 10 can next be selectively removed from the first one of the windows 12 and releasably connected to an interior surface 20 of a second one of the windows to follow the movement of the sun relative to the windows 12, as shown at 74,78 and 80 in FIG. 9; and a room or compartment 14 associated with the second one of the windows 12 can then be heated via the portable solar heater 10, as shown at 82 in FIG. 9. In this regard, the enclosed space 14 may be the same enclosed space 14 for each of the two windows or may be a first enclosed space 14 associated with the first window 12 and a second enclosed space 14 associated with the second one of the windows 12. Furthermore, a pair of the releasable supports 32 can be provided, with one of the releasable supports being used with the first one of the windows 12 and the other of the releasable supports being used with the second of the windows 12 so that only the sheet metal body 30 of the portable solar heater 10 must be moved from the first window 12 to the second window 12. Finally, it should be appreciated that a plurality of the solar heaters 10 can be used at the same time, either on the same window 12, or on a plurality of windows 12 of a building structure or vehicle 16. In this regard, in one highly preferred use of the solar heater 10, the inventor has found that when a pair of the portable solar heaters 10 are mounted one above the other, such as in a double hung window with one portable solar heater 10 mounted in the lower sash and the other portable solar heater 10 mounted in the upper sash, the performance of the pair of solar heaters 10 in combination appears to be enhanced because the temperature of the upper portable solar heater 10 is greater than it would otherwise be if the lower portable solar heater 10 was not in place.

In some highly preferred embodiments of the solar heater 10, the surface area of each of the surfaces 34 and 36 is no greater than two square feet to improve the portability of the solar heater 10. However, other applications may require greater sizes and no limitation to size is intended unless expressly stated in the claims. For similar reasons of portability, as well as for ease of mounting, in some highly preferred embodiments of the portable solar heater 10, the weight of the sheet metal body 30 is no greater than two pounds. However, other applications may require a sheet metal body 30 that is of greater weight than two pounds and no limitation to weight is intended unless expressly stated in the claims.

Preferably, a protective coating, such as tin plate, galvanize, Teflon, chromium, or stainless steel clad is applied to at least the surface 34, and preferably to the entire sheet metal body 30 to prevent corrosion. The protective coating preferably would underlie any decorative paint on the surface 34 or any radiant absorptive coating on the surface 36.

The sheet metal body 30 may be formed from any suitable material, such as for example, without limitation, iron, steel, stainless steel, aluminum, copper, etc., and the metal may be of various thickness or gauge.

From the foregoing, it should be appreciated that the sheet metal body 30 of the portable solar heater 10 can be made in a number of ways, such as for example, by stamping, pressing, or embossing, and be made into a number of designs or shapes using these methods, similar to the lids of popcorn tins or cake pans that form 3-dimensional shaped cakes.

It should be appreciated that the foregoing embodiments can provide a solar heater 10 that is portable. Further, it should be appreciated that the foregoing embodiments can provide a portable solar heater 10 that is also relatively inexpensive in comparison to conventional solar heaters. Furthermore, it should be appreciated that the foregoing embodiments can provide a portable solar heater 10 that is suitable for use in a vehicle, such as for example, when a user of the vehicle temporarily leaves the vehicle parked on a cold day and wishes to return to a vehicle that is less cold than would otherwise be the case if a solar heater was not utilized. In this regard, it should be noted, that in most instances the portable solar heater 10 would not appropriately be left in the window of a vehicle, such as an automobile or truck, when the vehicle is moving.

The inventor has performed numerous tests to determine the performance of the portable solar heaters 10 disclosed herein. In one test, the portable solar heater 10 was placed in the bottom of a cardboard box having about a 2'×2' cross section with a sheet of plexiglass closing the opening in the box facing the sun. Over a number of days of testing, the air temperature in the box was found to be in the range of about 120° F.to slightly over 140° F., depending upon the time of day and the outside conditions, which were sunny with a temperature range of about 72° F. to 87° F. The temperature of the solar heater itself under these test conditions was found to range from about 120° F. to over 175° F. Solar heaters 10 installed on a window pane of a house over the course of a mostly sunny day with an outside temperature ranging from about 14° F.to 21° F. were found to produce temperatures that ranged from 98° F.on the surface 34 of the solar heater 10 during the early morning hours to at least 128° F.before noon. The temperatures of the inside surface 20 of the window 12 to which the solar heater 10 was mounted were found to range around 79° F. to slightly over 100° F. In this regard, it is believed that one advantage of the solar heater 10 is that it increases the temperature of the window pane 18 to which it is attached, thereby increasing the heat generation into the enclosed space 14. The temperatures of the inside surface 20 of a glass pane 18 of a window 12 to which the solar heater was not mounted were also taken at the same time as the previously discussed testing and were found to range from 29.7° F. to 31.2° F.

What is claimed is:

1. A method for heating a house or vehicle including at least two windows having a fixed spacial relationship to each other, the method comprising the steps of:
   (a) releasably connecting a portable metal solar heater to an interior surface of a first one of said windows, said solar heater having a highly solar energy absorptive window facing surface;
   (b) heating an enclosed space associated with said first one of said windows via the solar heater;
   (c) removing the solar heater from said first one of said windows and releasably connecting the solar heater to an interior surface of a second one of said windows to follow the movement of the sun relative to said windows; and
   (d) heating an enclosed space associated with said second one of said windows via the solar heater.

2. The method of claim 1 wherein the enclosed space of step (d) is a different enclosed space from the enclosed space of step (b).

3. The method of claim 2 wherein said black coating is flat black paint.

4. The method of claim 1 further comprising the steps of affixing a first releasable connector to the first one of said windows and affixing a second releasable connector to the second one of said windows; and wherein step (c) further comprises disconnecting the solar heater from the first releasable connector and connecting the solar heater to the second releasable connector.

5. The method of claim 1 wherein said highly solar energy absorptive window facing surface has a black coating.

6. The method of claim 1 wherein said highly solar energy absorptive window facing surface has a radiant absorptivity that is no less than 0.90.

7. The method of claim 6 wherein said radiant absorptivity is no less than 0.94.

8. The method of claim 1 further comprising the step of providing a decorative feature on a side of the solar heater facing away from the interior surface of the window.

9. The method of claim 8 wherein said decorative feature is a decorative design.

10. The method of claim 9 wherein said decorative design is at least one of painted or embossed.

11. The method of claim 9 wherein said decorative design is defined by having part of the surface coated with paint and another part of the surface free from any paint coating.

12. A portable solar heater for use with a window of a room or compartment, the solar heater comprising:
a sheet metal body having a pair of oppositely facing surfaces separated by a thickness of the sheet metal, one of the surfaces being a highly solar energy absorptive window facing surface; and
a releasable support to mount said sheet metal body relative to an interior surface of said window;
wherein said releasable support comprises a suction cup.

13. The portable solar heater of claim 12 wherein said releasable support comprises an elongate flexible member extending from said suction cup to said sheet metal body.

14. A portable solar heater for use with a window of a room or compartment the solar heater comprising:
a sheet metal body having a pair of oppositely facing surfaces separated by a thickness of the sheet metal, one of the surfaces being a highly solar energy absorptive window facing surface; and
a releasable support to mount said sheet metal body relative to an interior surface of said window;
wherein said releasable support comprises a hook.

15. A portable solar heater for use with a window of a room or compartment, the solar heater comprising:
a sheet metal body having a pair of oppositely facing surfaces separated by a thickness of the sheet metal, one of the surfaces being a highly solar energy absorptive window facing surface;
a releasable support to mount said sheet metal body relative to an interior surface of said window; and
wherein the window facing surface is concave.

16. The portable solar heater of claim 15 wherein said window facing surface has a radius of curvature that is greater at a center of the window facing surface than at opposite edges of the window facing surface.

17. A portable solar heater for use with a window of a room or compartment, the solar heater comprising:
a sheet metal body having a pair of oppositely facing surfaces separated by a thickness of the sheet metal, one of the surfaces being a highly solar energy absorptive window facing surface; and
a releasable support to mount said sheet metal body relative to an interior surface of said window;
wherein the window facing surface is embossed.

18. A portable solar heater for use with a window of a room or compartment, the solar heater comprising:
a sheet metal body having a pair of oppositely facing surfaces separated by a thickness of the sheet metal, one of the surfaces being a highly solar energy absorptive window facing surface; and
a releasable support to mount said sheet metal body relative to an interior surface of said window;
wherein said sheet metal body comprises a peripheral flange extending around said window facing surface and extending from said window facing surface toward said window with said sheet metal body mounted relative to said interior surface.

19. The portable solar heater of claim 18 wherein at least a lower part of said flange abuts said interior surface.

20. A portable solar heater for use with a window of a room or compartment, the solar heater comprising:
a sheet metal body having a pair of oppositely facing surfaces separated by a thickness of the sheet metal, one of the surfaces being a highly solar energy absorptive window facing surface and the other of the surfaces is a room facing surface opposite to the window facing surface;
a releasable support to mount said sheet metal body relative to an interior surface of said window; and
wherein at least said room facing surface has a corrosion protective finish.

* * * * *